United States Patent [19]

Mariani

[11] 4,141,575
[45] Feb. 27, 1979

[54] COUPLING SLEEVE
[75] Inventor: Remo Mariani, Toms River, N.J.
[73] Assignee: Thomas & Betts Corporation, Elizabeth, N.J.
[21] Appl. No.: 819,548
[22] Filed: Jul. 27, 1977
[51] Int. Cl.² ............................................. F16L 37/08
[52] U.S. Cl. .................... 285/305; 285/158; 285/383; 285/423; 285/424; 285/DIG. 3
[58] Field of Search ................. 285/424, DIG. 3, 340, 285/423, 305, 419, 162, 383, 158; 24/129 B, 257; 403/309, 313; 113/116 H, 116 UT; 248/410, 295 C

[56] References Cited
U.S. PATENT DOCUMENTS

| 2,246,750 | 6/1941 | Murphy | 403/313 X |
| 2,360,732 | 10/1944 | Smith | 285/383 X |
| 2,484,192 | 10/1949 | Squiller | 285/340 X |
| 2,503,094 | 4/1950 | Buchanan | 285/383 X |
| 3,436,105 | 4/1969 | Miklya | 285/161 X |
| 3,556,566 | 1/1971 | Bromberg | 285/162 |
| 3,808,635 | 5/1974 | Moran | 248/410 |

Primary Examiner—Dave W. Arola
Attorney, Agent, or Firm—David Teschner; Jesse Woldman

[57] ABSTRACT

A hollow tubular member is provided with a plurality of obliquely oriented slots creating therebetween a series of ring elements which are offset from the transverse plan of the tubular member to provide an effective reduction of the internal diameter thereof for lockingly engaging an elongate element inserted within the tubular member. Both ends of the tubular member may be similarly slotted to provide an in-line coupling between two elongate members. Also disclosed is a method for forming the sleeve from a flat blank of material. Suitable modifications may be made to permit the sleeve to be attached to a support plate such as the wall of an electrical enclosure or the like.

7 Claims, 18 Drawing Figures

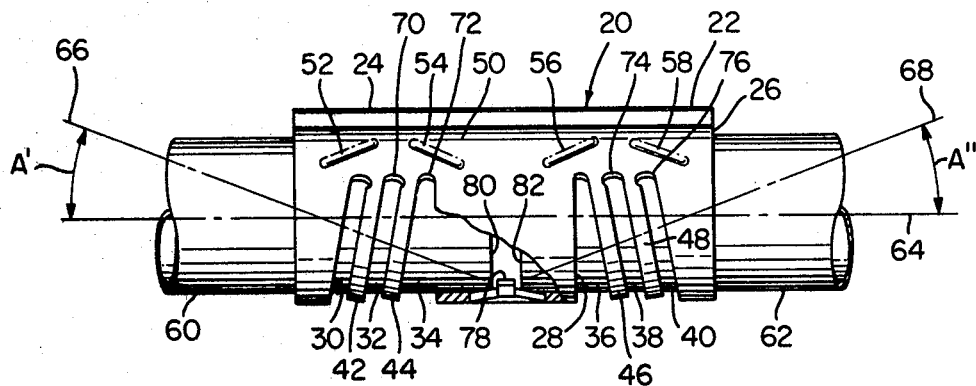
FIG. 1
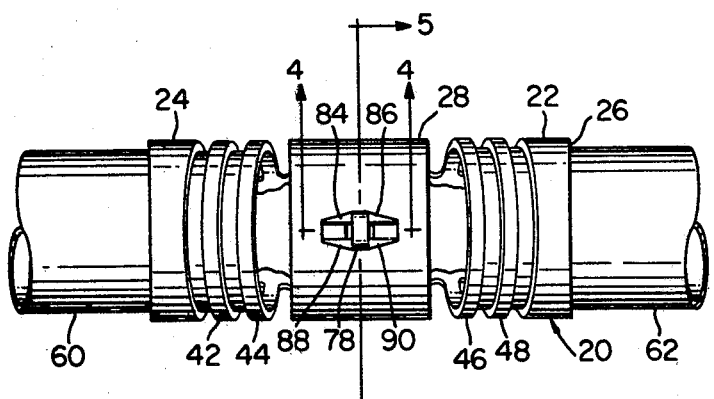
FIG. 3
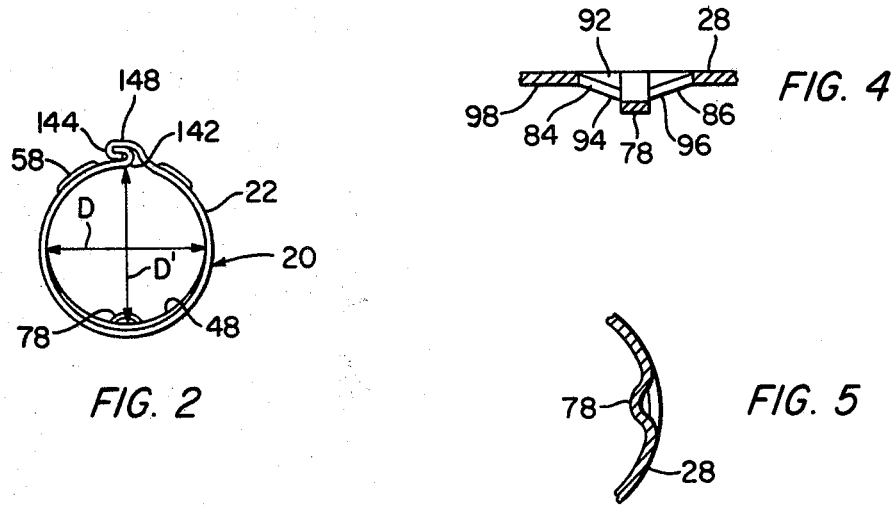
FIG. 2
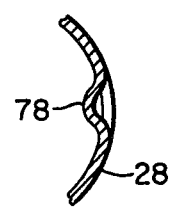
FIG. 4
FIG. 5

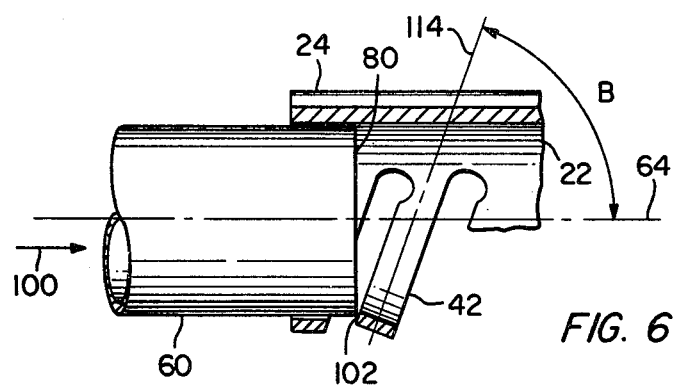
FIG. 6
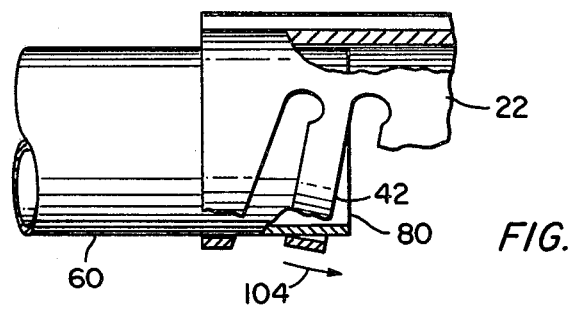
FIG. 7
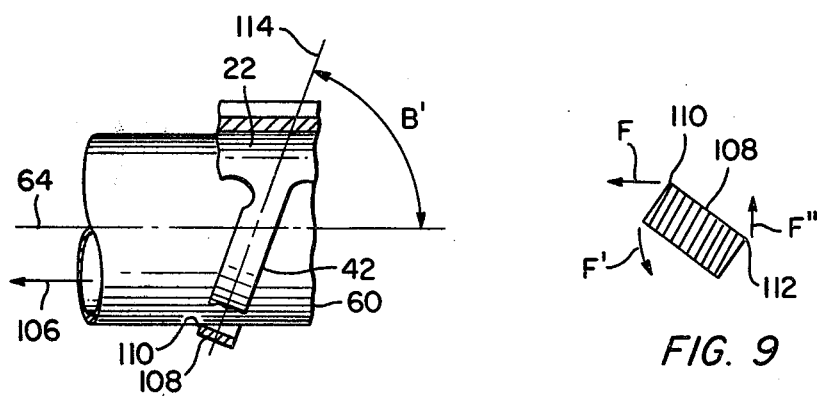
FIG. 8
FIG. 9
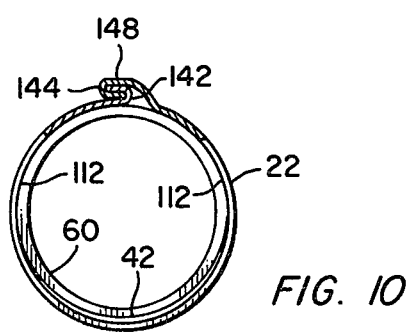
FIG. 10

COUPLING SLEEVE

BACKGROUND OF THE INVENTION

1. Field of the Invention

The invention is directed to the field of coupling means for elongate members.

2. Description of the Prior Art

A typical example of a prior art coupling device employing ring-like elements is disclosed in U.S. Pat. No. 2,246,750 issued to H. J. Murphy on June 24, 1941. This device comprises a series of D-shaped openings formed or stamped in an elongate length of flat material which is then bent into an undulating element arranged so that the central axes of the openings are inclined to one another to provide a locking fit about an elongate member inserted within the openings. The device is thus designed to provide an in-line coupling between two elongate members. Such devices, however, provide little resistance to bending and distortion and thus have often been found lacking in the necessary strength or rigidity required to provide a tight, secure coupling between such elongate members. Other devices for coupling elongate members include sleeve-like elements which are provided with locking screws or the like designed to bite into the elongate member to provide the necessary coupling. Such devices, although tending to serve a limited purpose, are relatively expensive to manufacture, comprise a plurality of parts, require additional time to affect the locking action, and are subject to corrosion or rusting of the threaded parts after a period of use. In many cases such devices are used to join electrical conduit wherein the ground connection between two conduit ends is provided by a path through the locking screws and the body of the coupling sleeve. Such grounding path may be rendered either partially or totally ineffective in the event of such rust or corrosion, thus causing a faulty and possibly dangerous condition.

SUMMARY OF THE INVENTION

The invention overcomes the limitations and difficulties noted above with respect to prior art devices by providing a coupling sleeve which is more reliable, efficient, less costly, and more rapidly installed than such prior art devices. The sleeve may be formed either from tubular stock or manufactured from a suitable blank of flat material which is then formed into the required tubular shape. The tubular member is defined by first and second end portions either or both of which may be suitably slotted in a generally transverse plane to provide a series of ring elements which depend from the unslit portion of the tubular member and are offset or tilted away from the central portion so as to provide an effective opening within each ring element somewhat smaller than the major interior diameter of the tubular member as viewed along the longitudinal axis of the tubular member. Where the tubular member is constructed of metallic material, the material should be chosen so as to have sufficient resiliency to permit the ring elements to be deflected somewhat upon the insertion of an elongate element into the tubular member and to then tend to return to their original position to effect a locking action between the interior edges of the ring elements and the external surface of the elongate elements inserted within the tubular member. Upon the attempted withdrawal of the elongate element from the tubular member the ring elements are subjected to a rotating force tending to twist the exterior of the ring element towards its interior throughout its periphery thus causing its interior edges to bite into the elongate element and further increase the locking engagement between the tubular member and elongate member. This twisting action of the ring element is due principally to the rigid attachment of the ring elements to the unslit or uncut portion of the tubular member which operates as a rigid rib or spine tending to confine the deflecting action of the ring elements to the aforesaid twisting motion. The rigidity of the coupling and the stiffness of each of the ring elements may be readily controlled or varied by varying the depth of the slotted portions creating such ring elements. The strength, rigidity, and resistance to torque of each ring element may also be controlled or varied by varying the spacing between the slotted portions and thus varying the width of each of the ring elements. Other embodiments employing the principle of the invention include a coupling sleeve having ring elements at one end and fastening means at the other end for attaching the coupling to a support member such as the panel or wall of an electrical enclosure or the like. In a further embodiment the ring elements may be skewed so as to define an essentially helical pattern permitting the insertion of an elongate member into the tubular sleeve in a threading motion. Stop means may be provided in the form of a protrusion or the like projecting towards the interior of the tubular sleeve to control the extent of insertion of an elongate element into the sleeve. It is therefore an object of this invention to provide an improved coupling device.

It is another object of this invention to provide a coupling sleeve for elongate elements or the like.

It is a further object of this invention to provide a method for making an improved coupling device for elongate elements or the like.

It is yet another object of this invention to provide an inexpensive coupling sleeve for elongate elements or the like.

It is yet a further object of this invention to provide a one-piece coupling device for elongate elements or the like.

It is still another object of this invention to provide a secure, reliable, and inexpensive coupling device for elongate elements or the like.

It is yet another object of this invention to provide a coupling device equally effective for use with both metallic and non-metallic elongate elements.

It is still a further object of this invention to provide a coupling device for elongate elements in which the degree of locking engagement may be readily controlled or varied.

It is yet a further object of this invention to provide a method for forming a tubular coupling sleeve containing a series of integral locking ring elements planarly disposed in a predetermined pattern for locking engagement with an elongate element inserted within the sleeve.

Other objects and features will be pointed out in the following description and claims and illustrated in the accompanying drawings, which disclose, by way of example, the principle of the invention and the best mode contemplated for carrying it out.

BRIEF DESCRIPTION OF THE DRAWINGS

In the Drawings

FIG. 1 is a side view, partly cut away and partly in section, of a coupling sleeve constructed in accordance with the concepts of the invention.

FIG. 2 is a right end view of the device of FIG. 1.

FIG. 3 is a bottom plan view of the device of FIG. 1.

FIG. 4 is a fragmentary sectional view taken along the line 4—4 of FIG. 3.

FIG. 5 is a sectional view taken along the line 5—5 of FIG. 3.

FIG. 6 is a fragmentary view, partly in section, of a portion of the device of FIG. 1 showing a first step in the coupling procedure.

FIG. 7 is a fragmentary view, partly cut away and partly in section, similar to FIG. 6, showing a further step in the coupling procedure.

FIG. 8 is a fragmentary view, partly cut away and partly in section, showing the dispostion of a ring element of the device of FIG. 1 when subjected to a disengaging force.

FIG. 9 is a schematic representation showing the forces applied to a portion of the ring element of the device of FIG. 1 during attempted disengagement.

FIG. 10 is an end view, partly in section, of the device of FIG. 1 showing the relative engagement between the ring element and an elongate member inserted within the device.

Similar elements are given similar reference characters in each of the respective drawings.

DETAILED DESCRIPTION OF THE PREFERRED EMBODIMENTS

Figure 11:
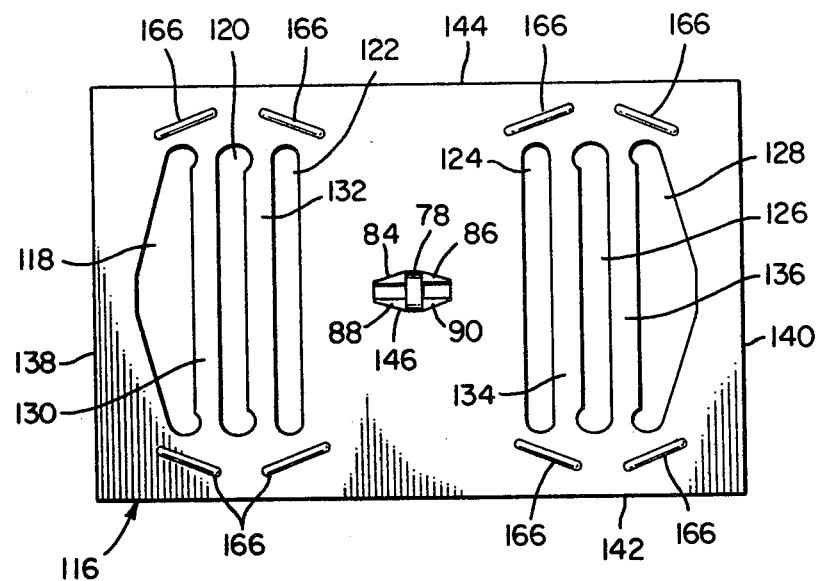
FIG. 11 is a top plan view showing a pre-blanked flat element constructed in accordance with the concepts of the invention.

Turning now to FIGS. 1 through 10, there is shown a coupling sleeve 20 (FIG. 1) constructed in accordance with the concepts of the invention and comprising a hollow tubular member 22 having a first end portion 24, a second end portion 26, and a central portion 28. The member 22, although shown as constructed of metallic material having preferably good resilient characteristics to permit a certain degree of elastic deflection without permanent set or deformation, may also be inexpensively manufactured from various non-metallic thermosetting or thermoplastic materials which may be readily formed or molded into the desired shape. Each end portion 24 and 26 is provided respectively with a series of slits 30, 32, 34, and 36, 38, and 40, and corresponding ring elements 42, 44, and 46, 48, each of which is connected to and depends from the unslit portion 50 of the member 22. Each end portion 24, 26 may be provided with a pair of stiffening ribs on either side of the unslit portion of the member 22 overlying the respective ring elements 42, 44, 46, and 48, there being visible in FIG. 1 only one pair of such ribs on each end portion 24, 26, as shown at 52, 54, and 56, 58. These ribs serve to stiffen the member 22 along the unslit portion 50 to at least partially compensate for the weakening effect caused by the introduction of the slits 30, 32, 34, 36, 38, and 40. As further shown in FIGS. 1 and 3, each of the ring elements 42, 44, 46, and 48 is planarly disposed at an oblique angle to the central axis of the member 22, being offset or tilted away from the central portion 28 towards the respective end portion 24, 26. Accordingly, the effective opening of each ring element presented to an elongate element such as 60, 62, is reduced somewhat relative to the actual interior opening of each ring element. This arrangement may be seen more clearly in FIG. 2 wherein the tubular member 22 is shown as viewed from the right side of FIG. 1. The planar displacement of the ring element 48 results in an effective opening D' somewhat less than the opening D as measured at each open end of the tubular member 22 in a direction normal to the central axis 64 of the tubular member 22. The remaining ring elements 42, 44, and 46, although not visible in FIG. 2, provide a similar reduction in the effective opening available for receiving the elongate elements 60 and 62. The amount of reduction of the effective opening resulting from the planar displacement of the ring elements 42, 44, 46, and 48 may be readily varied by varying the angle of displacement A' and A" of their respective central axes 66 and 68 (FIG. 1) from the central axis 64 of the tubular member 22. The spacing between any two adjacent slits 30, 32, 34, 36, 38, and 40 may be varied to vary the width of a corresponding one of the ring elements 42, 44, 46, and 48. To provide an increased degree of deflection of the ring elements 42, 44, 46, and 48 without permanent distortion, each of the slits 30, 32, 38, and 40 may be selectively enlarged at their juncture with the unslit portion 50 of the tubular member 22, as shown at 70, 72, 74, and 76 in FIG. 1 to reduce the cross section of each respective ring element 42, 44, 46, and 48, at an area adjacent thereto. The central portion 28 of the tubular member 22 may be provided with an inwardly directed protrusion 78 which may be generated by inwardly deforming the wall of the central portion 22, as shown more clearly in FIG. 5. The protrusion 78 thus serves as a stop means for controlling the extent of insertion of each of the elements 60 and 62 into the member 22 and also insures that the terminating end 80, 82, (FIG. 1) of each element 60 and 62, respectively, is properly located within the member 22. An anti-rotational feature may also be provided by the inclusion of beveled surfaces 84, 86, 88, and 90 shown in FIGS. 3 and 4 as bordering an opening 92 located in the central portion 28. Each of the surfaces 84, 86, 88, and 90 slopes at an oblique angle from the exterior of the central portion 28 to its interior to provide four sharp edges, two of which are shown in FIG. 4 at 94 and and 96 generated by the communication of the surfaces 84 and 86, respectively, with the interior surface 98 of the central portion 28.

The edges such as 94 and 96 also protrude inwardly slightly, as shown, and tend to engage and bite into the respective ends 80 amd 82 of the elements 60 and 62, thus advantageously resisting any rotational movement of the elements 60 and 62 within the tubular member 22.

Figure 12:
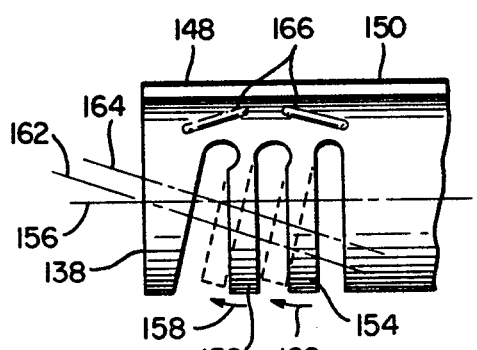
FIG. 12 is a fragmentary side elevational view showing a further step in a method of making a coupling sleeve in accordance with the concepts of the invention.

FIGS. 6, 7, 8, and 9 are enlarged views showing the manner in which the ring element 42 operates to provide locking engagement with elements such as 60 and 62. For the sake of convenience, only a portion of the tubular element 22 is shown which includes only the ring element 42, although it should be understood that the remaining ring elements 44, 46, and 48 function in a similar manner. It should be further understood that the normal internal diameter of the tubular member 22 as defined by the dimension D in FIG. 2 is chosen so as to provide a close sliding fit with the elements 60 and 62. Thus, the element 60 is readily inserted in the direction shown by the arrow 100 in FIG. 6 within the opening in the end portion 24 of the tubular member 22 to the position shown in FIG. 6. At this stage of the coupling procedure, the edge 80 of the element 60 contacts the immediately adjacent edge 102 of the ring element 42 and drives it towards the right, as viewed in FIG. 7, in the direction shown by the arrow 104 in FIG. 7. As the ring element 42 is deflected towards a position where its central axis is essentially coaxial with the central axis of the tubular member 22, its effective opening is enlarged sufficiently to accept the element 60 which may then slide past the ring element 42, as shown in FIG. 7, and abut and deflect the succeeding ring element 44 (not shown), until the end 80 of the element 60 is caused to stop at the protrusion 78 as shown in FIG. 1. As a result of their resilient coupling to the unslit portion 50 of the tubular member 22, the ring elements 42 and 44 will tend to return to their original oblique position, causing their interior edges to frictionally engage the exterior surface of the element 60 and hold the element 60 firmly in position within the tubular member 22. It appears that the removal of the element 60 from the tubular member 22 is resisted by a combination of forces generated on the ring element 42 by the element 60 which cause the inner edges of the ring element 42 to dig more deeply into the exterior surface of the elongate element 60. For example, with reference specifically to FIG. 8, when the element 60 is subjected to a force in the direction shown by the arrow 106 tending to remove the element 60 from the member 22, each incremental portion of the ring element 42, as exemplified by the section designated 108 in FIGS. 8 and 9, is subjected to a force F at the inner edge 110 which is in contact with the element 60. The force F produces a force couple F' and F" tending to rotate each incremental section such as 108 in a counterclockwise direction, as viewed in FIG. 9, urging the edge 112 (FIG. 10) opposite edge 110 into the exterior surface of the element 60 to increase the frictional engagement between the element 60 and the ring element 42. This action complements an additional frictional force produced between the exterior surface of the element 60 and the ring element 42 as the ring element 42 is cocked or tilted further away from its original position upon the attempted removal of the element 60. For example, where the original position of the ring element 42 lies in a plane tilted at an angle B (FIG. 6) with respect to the central axis 64 of the tubular member 22, upon the attempted removal of the element 60 from the member 22, the frictional force generated between the element 60 and the ring element 42 will tend to pull the ring element 42 towards the left, as viewed in FIG. 8, whereby the angle B' between the plane of the ring element 42, indicated by the line 114 in FIGS. 6 and 8, and the central axis 64 will be somewhat less than the angle B. This further tilt in the position of the ring element 42 will cause a corresponding decrease in the effective opening presented to the element 60 by the ring element 42 and, consequently, further frictional engagement with the element 60. The tubular member 22 may be formed either from selective lengths of tubular stock and appropriately slit to provide the configuration shown in FIG. 1, or may be formed from suitably blanked stock, as shown in FIGS. 11 and 12. Referring specifically to FIG. 11, the original blank may comprise a rectangular element 116 of metallic material which has been subjected to a further blanking or cutting operation to produce a series of parallel slotted openings 118, 120, 122, 124, 126, 128, intermediate which are created a corresponding series of thin strips 130, 132, 134, and 136. The contour of the element 116 is defined by a pair of parallel first edges 138 and 140, defining the length of the element 116, and a pair of parallel second edges 142 and 144, defining the width of the element 116. The element 116 may be subjected to a further blanking, cutting, or other suitable metal working operation to provide an opening 146 intermediate the ends of the element 116, as defined by the edges 138 and 140, and preferably symmetrically located midway between the slotted openings 118, 120, 122, and 124, 126, 128, the opening 146 corresponding to that shown in FIG. 3 within the central portion 28 and including the protrusion 78 and the beveled surfaces 84, 86, 88, and 90. The element 116 is then rolled or otherwise similarly worked into a tubular shape with the edges 142 and 144 brought together to provide a longitudinal seam 148 in which the edges 142 and 144 are preferably folded together and overlapped, substantially as shown in FIG. 2. The edges 138 and 140 thus comprise the ends of the resulting tubular member 150 a fragmentary portion of which is shown in FIG. 12 but which is essentially duplicative of the member 22 shown in FIG. 1. Since the strips 130, 132, 134, and 136 are aligned substantially parallel to the edges 138 and 140 in the configuration shown in FIG. 11, upon rolling the element 116 into a tubular shape these strips tend to form into ring elements similar to elements 42, 44, 46, and 48, of member 22, two of which are shown at 152 and 154 in FIG. 12, and which are planarly disposed normal to the central axis 156 of member 150. It should be noted that the ring elements formed in this operation are equal in number to one less than the number of slotted openings on each side of the element 116. Thus, the three slotted openings 118, 120, and 122 on the left side of element 116, as viewed in FIG. 11, produce the two ring elements 152 and 154, while the three slotted openings 124, 126, and 128 on the right side of the element 116, as viewed in FIG. 11, produces two ring elements (not shown) similar to elements 152 and 154 from the resulting arcuate configuration of the strips 134 and 136. Although there are shown two such ring elements on either side of the tubular members 22 and 150, an effective coupling sleeve such as 20 may be provided with only a single such ring element on either side, or with more than two such ring elements on either side, the illustration and description of a symmetrical arrangement of two such ring elements on either side of the tubular members 22 and 120 being merely for the sake of convenience and not as a limitation with respect to various other patterns, either symmetrical or unsymmetrical, which may be provided in accordance with the principles of the invention and the concepts herein disclosed. Returning now to FIG. 12, the ring elements 152 and 154 are then planarly offset in a direction shown by the respective arrows 158, 160, so that their respective central axes which are indicated by the lines 162 and 164, are disposed at an oblique angle to the central axis 156 of the tubular member 150, and essentially duplicative of the arrangement shown in FIG. 1. It should also be noted that the element 116 is further blanked or worked to provide stiffening ribs 166, corresponding to the ribs 52, 54, 56, and 58 shown in FIG. 1. The completed tubular member 150 which is formed from the original blank element 116 will function in essentially the identical manner as that provided by a structure formed from tubular stock, but has been found to be much more economical to manufacture.

Figure 13:
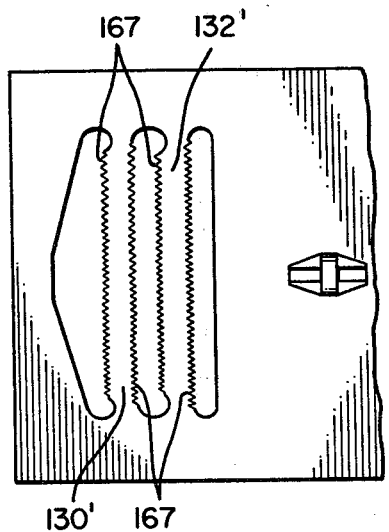
FIG. 13 is a fragmentary top plan view showing a further embodiment of a pre-formed blank for making a coupling sleeve in accordance with the concepts of the invention.

Turning now to FIG. 13 the side edges of the strips 130', 132', essentially duplicative of strips 130 and 132, may be serrated, as at 167, or otherwise provided with an interrupted pattern to increase the engagement between such edges and the exterior surface of an element such as 60.

Figure 14:
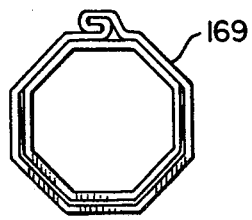
FIG. 14 is an end view of a further embodiment of a coupling sleeve constructed in accordance with the concepts of the invention.

Although a generally cylindrical tubular member 22 is shown in FIG. 1, other cross sectional arrangements may be provided, such as the polygonal shape indicated at 169 in FIG. 14 which are designed to closely approximate the cross sectional contour of the elongate element to be inserted therewithin.

Figure 15:
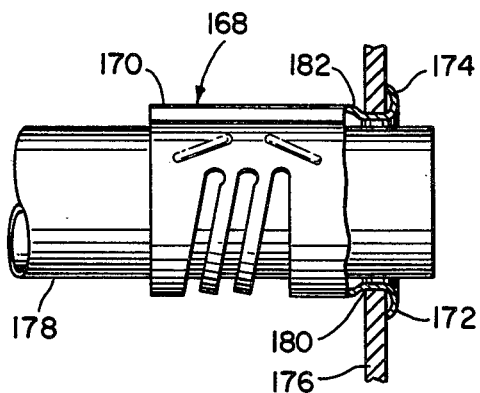
FIG. 15 is a side elevational view, partly cut away and partly in section, of still another embodiment of a coupling sleeve constructed in accordance with the concepts of the invention.

Referring now to FIG. 15, there is shown a further embodiment of a coupling sleeve 168 constructed in accordance with the concepts of the invention. The sleeve 168 comprises a first end portion 170 essentially the same as the first end portion 24 shown in FIG. 1. However, in this case there is provided a second end portion 172 having means shown as an enlarged flange 174 for joining the sleeve 168 to a support member which is shown in FIG. 15 as a wall portion 176. The sleeve 168 may thus be employed to couple an elongate tubular element such as 178 to a further structure such as the wall portion 176. The flange 174 is contiguous with a necked-down portion 180 adjacent to which is a shoulder portion 182. The flange 174 may be radially slotted to provide a series of resiliently deflectable finger portions (not shown) adapted to engage one side of the wall portion 176 while the shoulder portion 182 engages the opposite side thereof.

Figure 16:
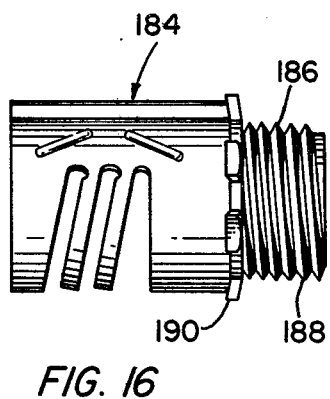
FIG. 16 is a side elevational view of yet another embodiment of a coupling sleeve constructed in accordance with the concepts of the invention.

FIG. 16 illustrates a further embodiment of a coupling sleeve 184 constructed in accordance with the concepts of the invention, differing from the sleeve 168 only in the configuration of the second end portion 186 which includes an externally threaded portion 188 having at its base an enlarged shoulder portion 190. The sleeve 184 may thus be threadably joined to a suitably threaded opening (not shown) in a wall portion such as 176 or, alternatively, may be inserted through a clearance hole in such wall portion 176 and a nut (not shown) applied to the threaded portion 188 to attach the sleeve 184 to such wall portion 176.

Figure 18:
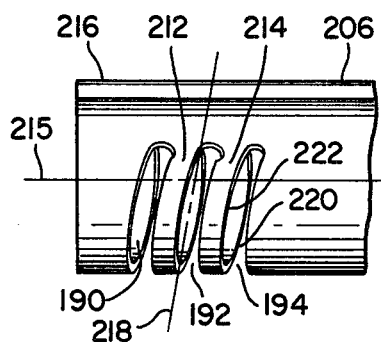
FIG. 18 is a fragmentary side elevational view showing the blank of FIG. 17 formed into a coupling sleeve in accordance with the concepts of the invention.
Figure 17:
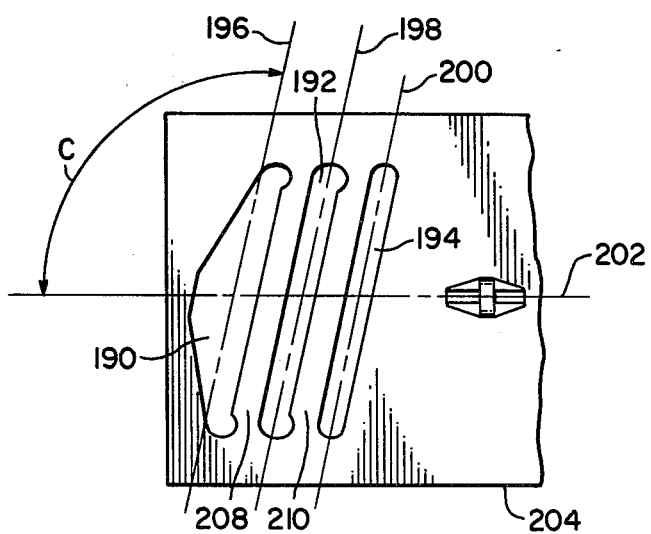
FIG. 17 is a fragmentary top plan view of a further embodiment of a pre-formed blank for making a coupling sleeve in accordance with the concepts of the invention.

Referring now to FIG. 17, the metallic element 116 shown in FIG. 11 may be provided with parallel slotted openings 190, 192, 194 corresponding to the openings 118, 120, and 122, and which are axially aligned along respective axes 196, 198, and 200 oriented at an oblique angle C to the central axis 202 of a metallic blank 204 similar to the element 116, as opposed to the perpendicular orientation shown in FIG. 11. Consequently, as the element 204 is formed into a tubular member 206 (FIG. 18), the strips 208 and 210 created between the respective slotted openings 190, and 192, and 192 and 194, are reformed into obliquely oriented ring elements 212 and 214 approximating a helical pattern about a central axis 215 at a first end portion 216 of the member 206. An elongate element such as 60 may thus be conveniently inserted into the member 206 by either a linear or twisting motion to establish the necessary coupling. The helical orientation of the ring elements further serve to create a locking engagement with an elongate element such as 60 generally equivalent to a screw thread arrangement, as compared with the binding engagement provided by the embodiment shown in FIG. 1. Each ring element 212, 214 thus tends to engage the outer surface of an element such as 60 along a helical path and will tend to resist the pull out of such element 60 from the member 206 by providing an additional plane of rotation of each ring element 212 and 214 about an axis 218, so that their side edges located generally at 220 and 222 (FIG. 18) are driven into biting engagement with the exterior surface of an element such as 60. It should, of course, be understood that suitable variations in the pitch, spacing, and angular orientation of the ring elements 212 and 214 may be provided, as necessary or desirable, without departing from the spirit of the invention and within the concepts herein disclosed.

The embodiments of the invention in which an exclusive property or privilege is claimed are defined as follows:

1. A coupling sleeve comprising: an elongate hollow tubular member having a first end portion, a second end portion, and a central portion intermediate said first and said second end portions, the wall of each of said first and said second end portions being partially slit in at least two longitudinally spaced locations along respective substantially parallel planes intersecting the central axis of said tubular member at an oblique angle thereto to provide at least one obliquely oriented deflectable ring element offset from the opening in said tubular member and depending respectively from the unslit portion of said wall of each of said first and said second end portions, said ring elements being initially tilted in opposite directions away from said central portion of said tubular member and being urged into alignment with the opening in said tubular member upon the insertion of the respective ends of two elongate elements at opposite ends of said tubular member, each of said ring elements being connected to said unslit portion of said wall by a portion having a width less than the width of said ring element.

2. A coupling sleeve as defined in claim 1 wherein said central portion is provided with means for limiting the extent of insertion of an elongate element within said tubular member.

3. A coupling sleeve as defined in claim 2 wherein said means comprises a protrusion depending from the interior surface of said central portion inwardly towards the interior of said tubular member.

4. A coupling sleeve as defined in claim 1 wherein said central portion is provided with means for resisting the rotation of an elongate element inserted within said tubular member.

5. A coupling sleeve as defined in claim 4 wherein said means for resisting the rotation of such elongate element comprises integrally formed peripheral edges protruding inwardly from a longitudinally slotted opening in said central portion, said edges lying along respective axes offset from the central axis of said central portion.

6. A coupling sleeve as defined in claim 1 wherein said tubular member is formed from metallic material.

7. A coupling sleeve as defined in claim 1 wherein said tubular member is formed from non-metallic material.

* * * * *